(12) United States Patent
Klein

(10) Patent No.: US 11,805,757 B1
(45) Date of Patent: Nov. 7, 2023

(54) EQUIPOTENTIAL SECURITY FENCE AND GROUNDING GRATE

(71) Applicant: Yak Access LLC, Columbia, MS (US)

(72) Inventor: Erik D. Klein, Canton, OH (US)

(73) Assignee: Yak Access LLC, Columbia, MS (US)

( * ) Notice: Subject to any disclaimer, the term of this patent is extended or adjusted under 35 U.S.C. 154(b) by 533 days.

(21) Appl. No.: 16/909,671

(22) Filed: Jun. 23, 2020

Related U.S. Application Data

(60) Provisional application No. 62/865,751, filed on Jun. 24, 2019.

(51) Int. Cl.
  *A01K 3/00* (2006.01)
  *E04H 17/18* (2006.01)
  *E04H 17/16* (2006.01)
  *E04H 17/00* (2006.01)

(52) U.S. Cl.
  CPC ........... *A01K 3/005* (2013.01); *E04H 17/003* (2013.01); *E04H 17/017* (2021.01); *E04H 17/166* (2013.01); *E04H 17/18* (2013.01)

(58) Field of Classification Search
  CPC ..... E04H 17/16; E04H 17/161; E04H 17/163; E04H 17/17; E04H 17/18; E04H 17/185
  See application file for complete search history.

(56) References Cited

U.S. PATENT DOCUMENTS

| | | | | |
|---|---|---|---|---|
| 903,258 A | * | 11/1908 | Woodson | E04H 17/003 256/11 |
| 1,251,926 A | * | 1/1918 | Schlesinger | E04H 17/16 119/513 |
| 3,204,606 A | * | 9/1965 | Parr | A01K 1/0005 16/236 |
| 3,469,822 A | * | 9/1969 | O'Brien | E04H 17/18 256/25 |
| 4,776,429 A | * | 10/1988 | Osborn | B65G 69/22 182/147 |
| 4,787,111 A | * | 11/1988 | Pacek | B65G 69/22 49/369 |
| 4,967,057 A | | 10/1990 | Bayless et al. | |
| 5,295,557 A | * | 3/1994 | Taylor | E02D 29/127 182/128 |
| 5,542,649 A | * | 8/1996 | Allegaert | E04H 17/161 256/54 |

(Continued)

FOREIGN PATENT DOCUMENTS

| | | |
|---|---|---|
| CH | 688966 | 6/1998 |
| CN | 87212162 | 7/1988 |

(Continued)

OTHER PUBLICATIONS

[No Author Listed], "TFS Station Equipment Bulletin, Equipotential Zone (EPZ) Mats for Temporary Installation—Planning and Process Notes," AEP Transmission, Oct. 24, 2018, 2 pages.

(Continued)

*Primary Examiner* — Jonathan P Masinick
(74) *Attorney, Agent, or Firm* — Fish & Richardson P.C.

(57) ABSTRACT

A security system for preventing ungrounded personnel access into an equipotential zone is described. The security system includes a conductive fence and a conductive mat. The conductive mat is mechanically and electrically coupled to the conductive fence to define an equipotential zone.

17 Claims, 6 Drawing Sheets

(56) References Cited

U.S. PATENT DOCUMENTS

| | | | |
|---|---|---|---|
| 5,577,687 A | 11/1996 | Downing | |
| 5,653,551 A | 8/1997 | Seaux | |
| 6,007,271 A | 12/1999 | Cole et al. | |
| 6,151,852 A * | 11/2000 | Linn | E04H 17/163 |
| | | | 52/745.1 |
| 6,278,085 B1 | 8/2001 | Abukasm | |
| 6,477,027 B1 | 11/2002 | McKelvy | |
| 6,511,257 B1 | 1/2003 | Seaux et al. | |
| 6,712,339 B1 * | 3/2004 | Smith | A01K 3/005 |
| | | | 256/10 |
| 6,888,081 B2 | 5/2005 | Friedrich et al. | |
| 7,370,452 B2 | 5/2008 | Rogers | |
| 7,404,690 B2 | 7/2008 | Lukasik et al. | |
| 7,413,374 B2 | 8/2008 | Rogers et al. | |
| 7,427,172 B2 | 9/2008 | Lukasik | |
| 7,604,431 B2 | 10/2009 | Fournier | |
| 7,645,962 B2 | 1/2010 | Krossa et al. | |
| 7,874,545 B2 * | 1/2011 | Fumagalli | E01F 13/022 |
| | | | 256/25 |
| 8,061,929 B2 | 11/2011 | Dagesse | |
| 8,308,141 B1 * | 11/2012 | Mellins | E04H 17/22 |
| | | | 256/25 |
| 8,382,393 B1 | 2/2013 | Phillips | |
| 8,414,217 B2 | 4/2013 | Rosan | |
| 8,511,257 B2 | 8/2013 | Thibault | |
| 8,545,127 B2 | 10/2013 | Bleile et al. | |
| 8,616,804 B2 | 12/2013 | Corser | |
| 8,800,717 B2 * | 8/2014 | Berry, Jr. | B60R 3/005 |
| | | | 182/113 |
| 8,864,110 B2 * | 10/2014 | Xu | E04H 17/20 |
| | | | 256/DIG. 5 |
| 8,902,559 B2 * | 12/2014 | Xu | H01B 5/002 |
| | | | 361/220 |
| 8,936,073 B1 | 1/2015 | Phillips | |
| 8,951,055 B2 | 2/2015 | Eusterholz | |
| 9,068,584 B2 | 6/2015 | McDowell et al. | |
| 9,212,746 B2 | 12/2015 | McDowell | |
| 9,337,586 B2 | 5/2016 | McDowell et al. | |
| 9,368,918 B2 | 6/2016 | McDowell et al. | |
| 9,450,126 B1 | 9/2016 | Streett et al. | |
| 9,458,578 B2 * | 10/2016 | Klein | E01C 9/083 |
| 9,515,395 B1 * | 12/2016 | Chadbourne | H01R 4/46 |
| 9,735,510 B2 * | 8/2017 | McDowell | E21B 41/0021 |
| 9,909,708 B1 | 3/2018 | Penland et al. | |
| 9,915,036 B2 | 3/2018 | Penland | |
| 9,972,942 B1 * | 5/2018 | Bordelon | E01C 5/005 |
| 9,985,390 B2 | 5/2018 | McDowell et al. | |
| 10,024,075 B2 * | 7/2018 | McDowell | E04B 5/026 |
| 10,070,508 B2 * | 9/2018 | Ricks | E04H 17/18 |
| 10,181,681 B1 * | 1/2019 | Klein | H01R 13/648 |
| 10,448,492 B1 * | 10/2019 | Wang | H05F 3/025 |
| 2002/0178661 A1 | 12/2002 | Burke et al. | |
| 2004/0040784 A1 * | 3/2004 | Johnson | E02D 29/12 |
| | | | 182/113 |
| 2004/0154908 A1 | 8/2004 | Friedrich et al. | |
| 2004/0253861 A1 | 12/2004 | Schubert et al. | |
| 2005/0218393 A1 * | 10/2005 | Larsen | E04H 17/161 |
| | | | 256/32 |
| 2005/0239320 A1 | 10/2005 | Folkema | |
| 2005/0270175 A1 | 12/2005 | Peddie et al. | |
| 2006/0038165 A1 * | 2/2006 | Larsen | E04H 17/02 |
| | | | 256/32 |
| 2007/0237581 A1 | 10/2007 | Lukasik et al. | |
| 2007/0258767 A1 | 11/2007 | Tapp | |
| 2008/0075533 A1 | 3/2008 | Fournier | |
| 2010/0058688 A1 * | 3/2010 | Goddard | E04B 2/7433 |
| | | | 52/270 |
| 2013/0051911 A1 | 2/2013 | Corser | |
| 2013/0264773 A1 | 10/2013 | McDowell | |
| 2013/0309008 A1 | 11/2013 | Fournier | |
| 2014/0189985 A1 | 7/2014 | McDowell et al. | |
| 2014/0193196 A1 | 7/2014 | Fournier | |
| 2014/0255108 A1 | 9/2014 | McDowell | |
| 2015/0029040 A1 | 1/2015 | McDowell et al. | |
| 2015/0099377 A1 | 4/2015 | McDowell et al. | |
| 2015/0101831 A1 | 4/2015 | Dugas et al. | |
| 2015/0266669 A1 | 9/2015 | McDowell | |
| 2016/0017547 A1 | 1/2016 | Bordelon et al. | |
| 2016/0017910 A1 | 1/2016 | McDowell et al. | |
| 2016/0032537 A1 | 2/2016 | Edwards et al. | |
| 2016/0047141 A1 * | 2/2016 | Juett | E04H 17/18 |
| | | | 256/25 |
| 2016/0076204 A1 | 3/2016 | McDowell | |
| 2016/0083974 A1 * | 3/2016 | Meza | E04H 17/163 |
| | | | 248/219.4 |
| 2016/0090806 A1 * | 3/2016 | Dugas | E21B 33/02 |
| | | | 166/75.13 |
| 2016/0118747 A1 | 4/2016 | McDowell et al. | |
| 2016/0301161 A1 | 10/2016 | McDowell et al. | |
| 2016/0312490 A1 | 10/2016 | McDowell et al. | |
| 2016/0355995 A1 | 12/2016 | Edwards et al. | |
| 2016/0355996 A1 | 12/2016 | Edwards et al. | |
| 2017/0073904 A1 | 3/2017 | McDowell et al. | |
| 2018/0375260 A1 | 12/2018 | Klein | |

FOREIGN PATENT DOCUMENTS

| | | | |
|---|---|---|---|
| DE | 29517717 U1 * | 2/1996 | |
| EP | 1128713 | 8/2001 | |
| EP | 1727251 A2 * | 11/2006 | H02G 1/04 |
| GB | 599042 A * | 3/1948 | |
| GB | 2167786 A * | 6/1986 | E04H 17/003 |
| KR | 20090036364 A * | 4/2009 | |
| WO | WO 2002072974 | 9/2002 | |

OTHER PUBLICATIONS

Sep. 4, 2015 Sterling Press Release.
Aug. 10, 2012, photos 1-4 of grounding mats used by MJ Electric in USA.
Aug. 2012, photos of conductive grid on Dura-Base Mats from Balfour Beatty Utility Services.
Aug. 2013, Temporary Grounding for Lineworker Protection, How to Safely Install and Remove Personal Protective Grounds, Fifth Edition, Second printing Aug. 2013, Alexander Publications, see Appendix B, pp. 91-96.
Copyright 2010, Kri-Tech Products Ltd, Portable Protective Bond Mat.
Dec. 2012, photos 1-9 of welded 4×8 steel conductive mats used by MJ Electric in Iowa, USA.
Hastings grounding and Jumper Equipment, Grounding Mat, Jan. 2011, 1 pp.
Jan. 17, 2012, Terrafirma, Electricity Alliance Sums up Dura-Base Mats . . . Security, Savings, and Service.
Jan. 2010, Grounding for Lineworker Protection, Second Edition, First printing Jan. 2010, Alexander Publications, see Appendix B, pp. 85-89.
Jul. 23, 2012, photos 1 and 2 of grounding mats used by MJ Electric in USA.
May 2017, photos 1 and 2 of EPZ zone from PAR Electric, used in USA prior to May 2017, dates of use unknown.
May 9, 2014, Document 5.3.2 Environmental Statement Project Description Appendices, Hinkley Point C Connection Project, Appendix 3G: Risk Assessments and Method Statements.
Sep. 2007, Live Line Work Practices, Second Edition, First printing: Sep. 2007, Alexander publications 2002, Chapters 10 and 11, see pp. 403-406, 436.
Standard (Orange) Equi-Mat Personal Protective Ground Grid, Hubbell Power Systems, Inc., http://www.hubbellpowersystems.com/lineman/grounding/ground-grids/ground-grid.asp, 2 pp.
Sterling EquiPotential Matting; publication date unknown, access from http://www.sterlingcranemats.com/ Sep. 18, 2015.
Summer 2015, Transmission Line, An M.J. Electric Publication, p. 4, Equipotential Zone (EPZ) Advancements.
The World's Latest Trackway, Copyright Liontrackhire 2015, http://www.liontrackhire.com/trackway/, 8 pp.

* cited by examiner

EQUIPOTENTIAL SECURITY FENCE AND GROUNDING GRATE

CROSS-REFERENCE TO RELATED APPLICATIONS

This application claims priority to U.S. Provisional Patent Application No. 62/865,751, filed on Jun. 24, 2019, the entire contents of which are incorporated herein by reference.

TECHNICAL FIELD

This disclosure relates to security fences, and more particularly to equipotential security zones.

BACKGROUND

Security fences are a barrier to deter people from entering a designated area. Some areas are designated to facilitate electrical work by electrical workers. These fences deter non-workers from interfering in electrical work. Mats are placed in a designated area to provide a stable usable surface for personnel and equipment. These devices are often used to prevent heavy equipment from sinking into the earth. Some types of mats are timber mats, polymer mats, or metal mats. The mats can be abutted, connected, or interconnected to create the usable surface. Other mats are used to create an equipotential work ground surface. Equipotential can also be referred to as electrical bonding or bonded. An equipotential work ground surface is a work ground surface where all exposed metal portions, even those not designed to carry an electrical load, to protect equipment and personnel from electrical shock. These surfaces are known as equipotential mats or equipotential grates. The equipotential mats and equipotential grates provide a conductive layer upon which equipment is supported and upon which workers walk. These can be used alone or together in groups to define an equipotential ground work surface.

Equipotential mats are used to create an equipotential ground work zone for wire-puller and tensioner operations. In one instance, during tensioning or removing de-energized conductors there is a possibility of the conductor accidentally contacting an energized circuit or receiving a dangerous induced voltage buildup. In another instance, prior to stringing parallel to an existing energized transmission line, dangerous induced voltage buildups could occur, particularly during switching and ground fault conditions. In these two instances, equipotential groundwork surfaces are used to isolate, insulate, and effectively ground the work area.

SUMMARY

This disclosure relates to security fences and equipotential work zones. In an exemplary implementation, a security system includes a conductive fence and a conductive mat. The conductive mat is mechanically and electrically coupled to the conductive fence. The conductive fence and the conductive mat define an equipotential zone.

In some implementations, the security system includes a non-conductive enclosure surrounding the equipotential zone. The enclosure is configured to prevent human contact with the fence while being in contact with the ground. In some implementations, the conductive mat has a conductive layer and a non-conductive layer.

In some implementations, the security system includes a grounding access mat.

In some implementations, the conductive mat is a metal equipotential grounding grate.

In some implementations, the conductive fence includes multiple fence posts electrically and mechanically coupled to the conductive mat and multiple fence panels electrically and mechanically coupled to the fence posts.

In some implementations, multiple clamps electrically and mechanically coupled the fence panels to the fence posts.

In some implementations, a height of the fence post is configured to prevent a person from climbing over the conductive fence.

In some implementations, the fence panels include vertical ribs and horizontal ties. The vertical ribs are mechanically and electrically coupled to the horizontal ties to prevent a person from climbing through the plurality of fence panels.

In some implementations, the vertical ribs are configured to prevent a person from climbing over the vertical ribs.

In some implementations, a height of the vertical ribs is configured to prevent a person from climbing over the conductive fence.

In some implementations, the vertical ribs have a first end and a second end. The first end and the second end are shaped to prevent a person from climbing over the conductive fence.

In some implementations, the conductive fence includes a lockable door.

In some implementations, the lockable door includes a door frame, multiple horizontal ties, multiple vertical ribs, hinges, and a lock latch. The horizontal ties are mechanically and electrically coupled to the door frame. The vertical ribs and the horizontal ties are mechanically and electrically coupled to the door frame to prevent a person from climbing through the lockable door. The hinges are mechanically and electrically coupled to a door frame first side and a door hinge fence post. The lock latch is mechanically coupled to a door frame second side and a door lock fence post.

In some implementations, the security system is configured to enclose an electrical sub-station.

In some implementations, the electrical sub-station is portable.

In other exemplary implementations, an equipotential grounding system a portable electrical substation is disposed on multiple grounding grates and within a security fence. The grounding grates are mechanically and electrically coupled to the security fence.

In some implementations, the security fence includes a lockable door.

In some implementations, a grounding access mat is mechanically and electrically coupled to the grounding grate and the security fence at the lockable door.

In some implementations, the security fence includes multiple fence posts mechanically and electrically coupled to the grounding grates and multiple fence panels electrically and mechanically coupled to the plurality of fence posts.

Implementations may optionally include, but are not limited to, one or more of the following advantages. Electrical worker safety may be improved, e.g., non-grounded personnel and non-grounded equipment may be prevented from entering the designated electrical work zone to create an electrical short harming electrical workers. Non-grounded personnel safety may be improved, e.g., non-grounded personnel may be prevented from entering the designated electrical work zone to create an electrical short harming non-grounded personnel. Electrical equipment reliability may be improved, e.g., non-grounded personnel may be prevented from electrically coupling to electrical equipment, damaging electrical equipment. Electrical equipment maintenance and repair costs may be reduced as less electrical equipment may be damaged. Continuity of power from electrical sub-stations may be increased as less electrical equipment may be damaged.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure relates to a security system with a conductive fence and a conductive mat that are mechanically and electrically connected to form an equipotential security zone. The conductive mat forms a stable work surface used to prevent personnel and heavy equipment from sinking into the Earth. The conductive mat is mechanically and electrically connected to the conductive fence. The conductive fence prevents ungrounded personnel and equipment from entering the equipotential security zone.

Figure 1:
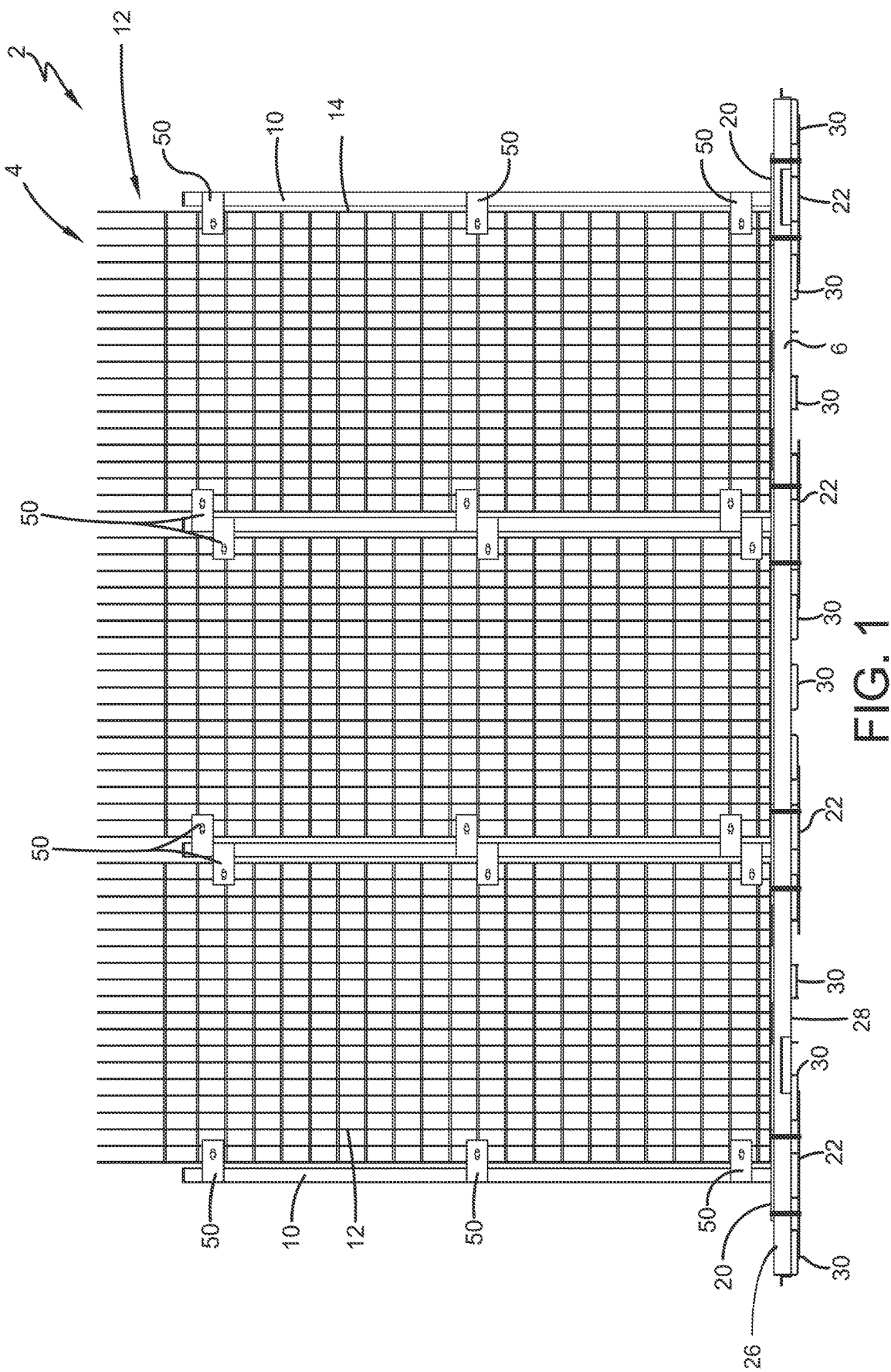
FIG. 1 illustrates a side elevation view of an exemplary configuration of a conductive security fence with a metal equipotential grounding grate.
Figure 2:
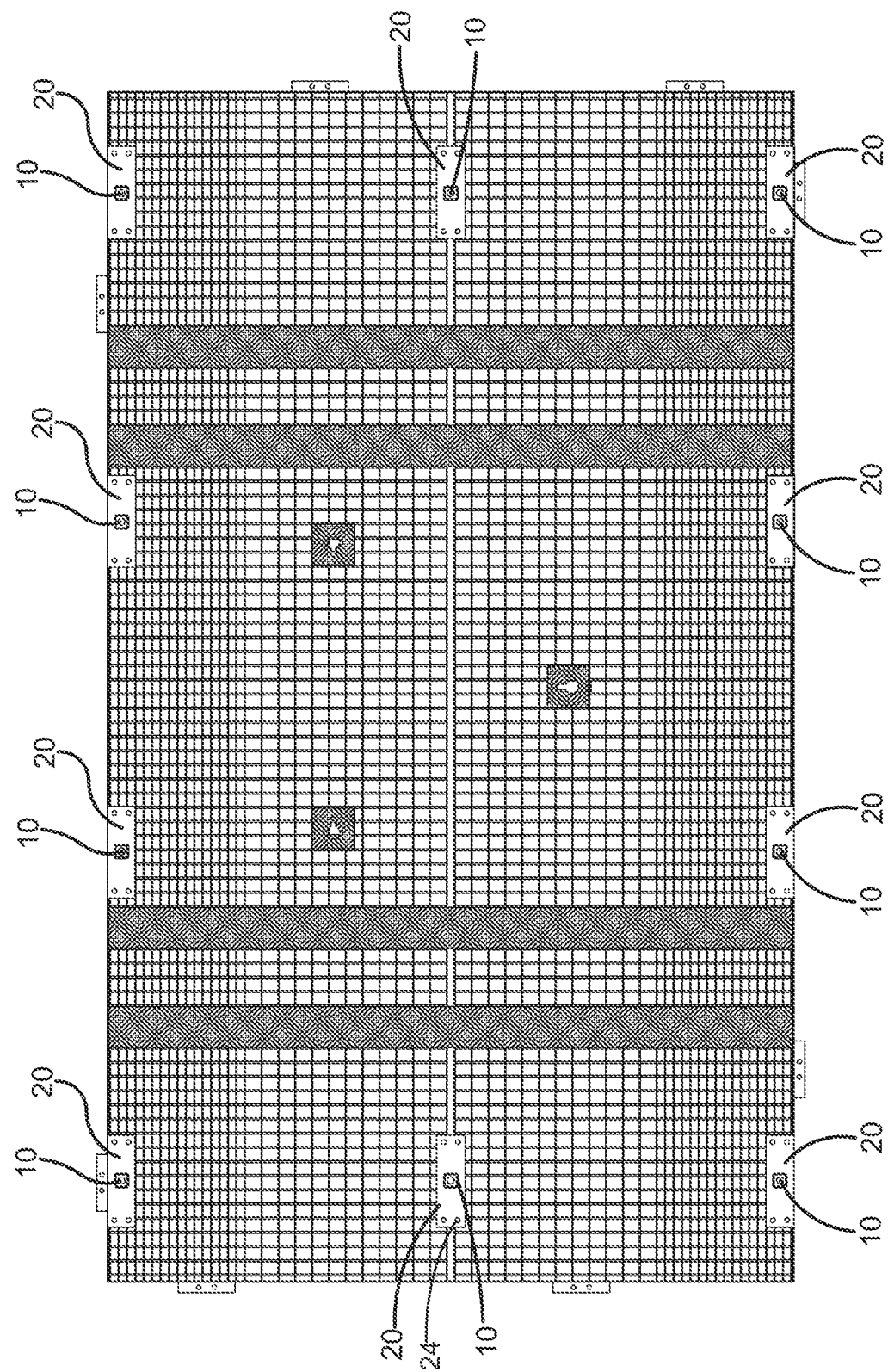
FIG. 2 illustrates a top plan view of the metal equipotential grounding grate with the fence posts installed.

FIG. 1 shows a side elevation view of an exemplary configuration of the security system 2 with of a conductive fence 4 mechanically and electrically connected to conductive mat 6. The security system 2 is constructed from electrically conductive material. The electrical conductive material can be a metal. For example, the security system 2 can be constructed of steel. The conductive mat 6 is placed on the ground. The conductive mat 6 can have a conductive layer and a non-conductive layer. For example, a metal conductive layer can be placed above a rubber non-conductive layer. The metal conducive layer can provide the equipotential surface, and the rubber non-conductive layer can provide protection from water on the ground. Referring to FIG. 2, the conductive mat 6 can be a metal grate. A grate is grid-like lattice framework. The conductive mat 6 has a perimeter shape. For example, the perimeter shape can be a square, a rectangle, a circle, a triangle, a trapezoid, or an octagon.

Figure 6:
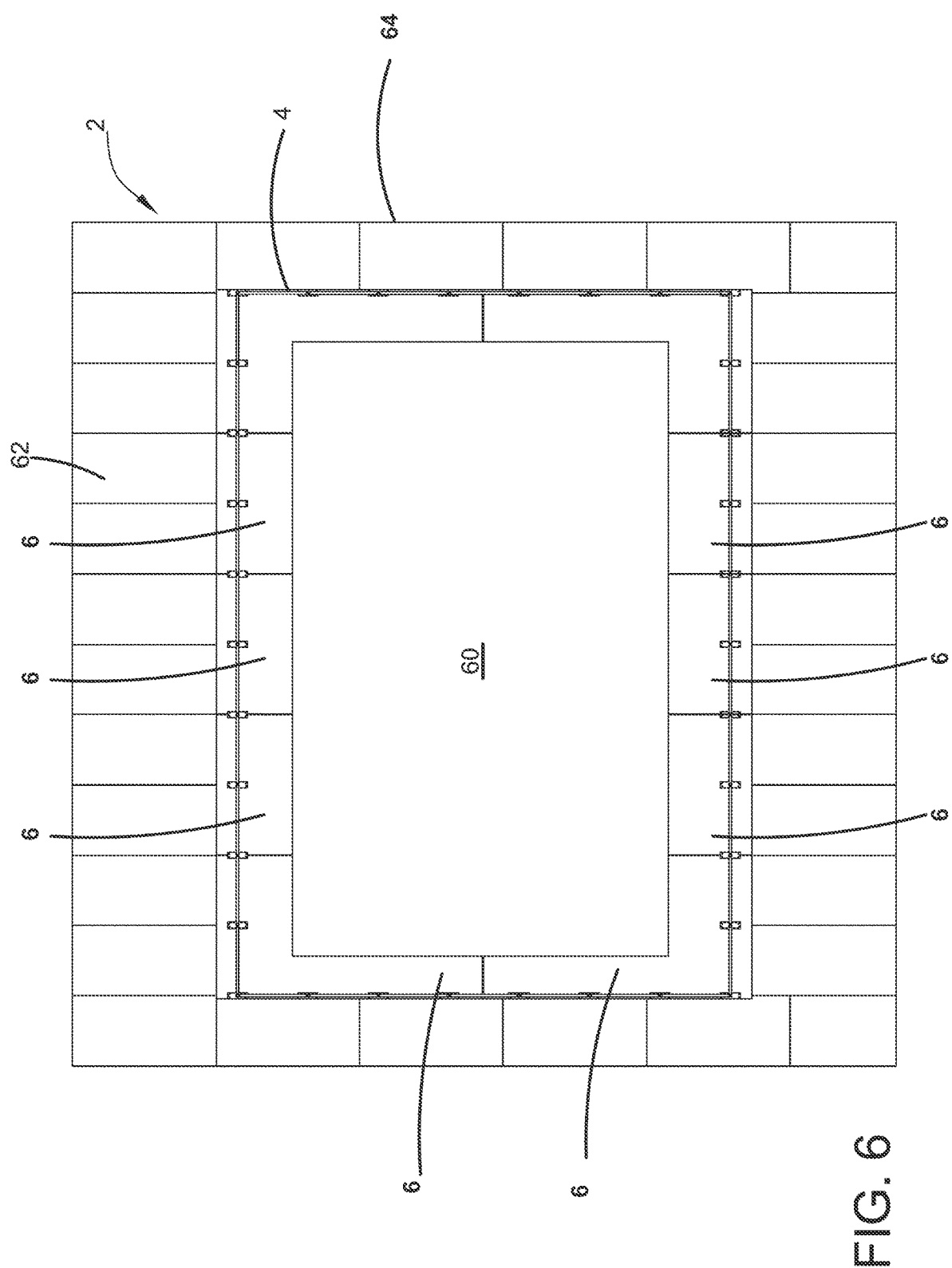
FIG. 6 illustrates a schematic view of a portable substation with an equipotential zone and security fence.

The conductive mat 6 can include multiple mats 6 or grates. The security system 2 can create a security perimeter around a single conductive mat 6. In other configurations, security system 2 can create a security perimeter about multiple conductive mats 6 (as shown in FIG. 6). Security system 2 can form a rectangular security perimeter or can define an irregular shape as needed for a particular application.

When multiple mats are combined to form a larger mat, the mats are structurally supported by multiple floor plates 30. The multiple conductive mats 6 can be permanently coupled or optionally coupled to the floor plates 30. For example, the fence posts 10 can be permanently coupled to the conductive mat 6 by welding. For example the fence posts 10 can be optionally coupled to the conductive mat 6 by fasteners. Examples of fasteners are bolts and nuts.

Multiple fasteners 24 extend through the conductive mat 6 and through the floor plate 30 which engages the lower surface 28 of the conductive mat 6. When the fasteners 24 are tightened, the conductive mat 6 and the floor plate 30 are fastened or are joined together. These fasteners are nut and bolt combinations with the nuts being secured to the floor plate 30. The nuts can be welded to the floor plate 30. This configuration allows the bolts to be tightened and loosened from the top surface 26 of the conductive mat 6 without the need to place a wrench on the nut beneath the conductive mat 6. This also prevents the loss of the nuts. The bolts extend down between floor plates 30. In another configuration, bolts are welded to and extend up from lower floor plates 30 and the user tightens nuts onto the bolts from above.

The conductive fence 4 is coupled to the conductive mat 6. The conductive fence 6 includes fence posts 10 and fence panels 12. The fence posts 10 are coupled to the conductive mat 6 and extend upwards from the conductive mat 6 to vertically support the fence panels 12. A fence panel 12 is supported by two fence posts 10, coupled to each vertical side of the fence panel 12. The fence posts 10 are coupled to the conductive mat 6. The fence posts 10 can be permanently coupled or optionally coupled to the conductive mat 6. For example, the fence posts 10 can be permanently coupled to the conductive mat 6 by welding. For example the fence posts 10 can be optionally coupled to the conductive mat 6 by fastener, substantially similar to permanently coupled and optionally coupled discussed earlier. The upper support plate 20 is configured to hold the fence post 10 in vertical direction from the surface of the Earth. The upper support plate 20 can be permanently coupled or optionally coupled to the fence post 10, substantially similar to permanently coupled or optionally coupled discussed earlier. Multiple fasteners 24 extend through upper support plate 20, through conductive mat 6, and through a lower support plate 22 which engages the lower surface 28 of conductive mat 6. The lower support plate 22 is aligned perpendicular to the floor plates 30. Lower support plate 22 is long enough to engage at least two floor plates 30 of conductive mat 6. When the fasteners 24 are tightened, support plates 20 and 22 are clamped against conductive mat 6 and hold fence post 10 substantially vertical. Four fasteners are used with each set of upper support plate 20 and lower support plate 22. The fasteners are coupled substantially similar to previously discussed.

Figure 5:
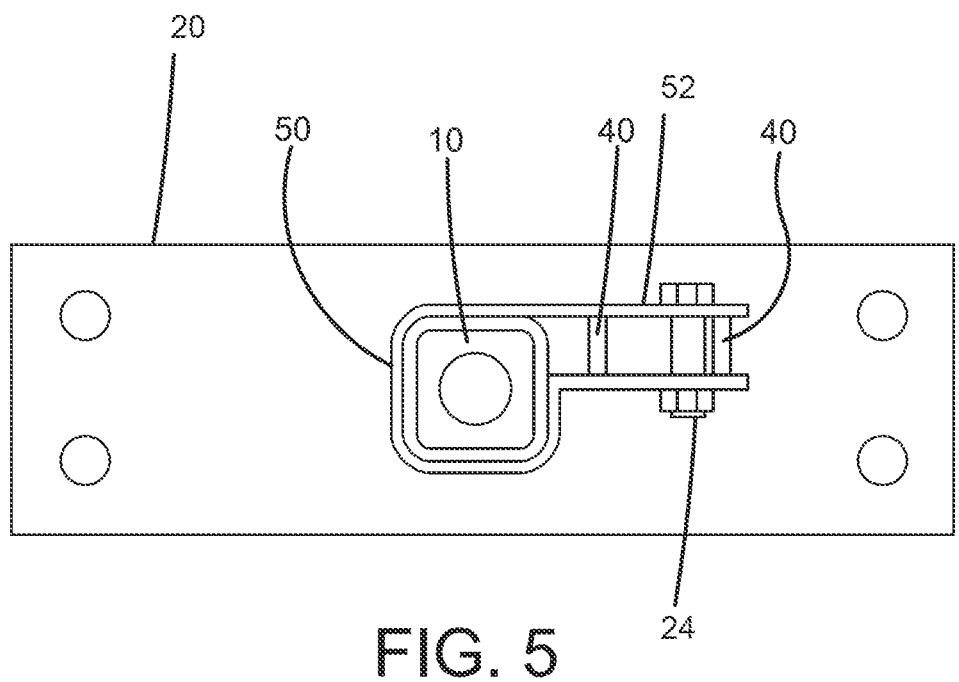
FIG. 5 illustrates a top view showing the connection of a clamp with the fence post and fence panel.

The conductive fence 4 includes fence panels 12. The fence panels 12 are mechanically coupled and electrically coupled to the fence posts 12. Fence panels 12 are removably attached to the fence posts 10 with multiple clamps 50. Referring to FIG. 5, each clamp 50 is generally U-shaped with a base disposed around at least three sides of fence post 10 and two arms 52 that extend across the fence panel 12. Fasteners 24, such as nut and bolt combinations, compress the arms 52 against the fence panel 12 to hold fence panel 12 in place. Three clamps 50 are used along each vertical edge 14 of each fence panel 12. In configurations where fence post 10 has a depth that is greater that the depth of fence panel 12 (see FIG. 5), each clamp 50 also extends across a portion of the fourth side of fence post 10 that faces fence panel 12 so that the arms 52 of clamp 50 are spaced apart slightly wider than the depth of fence panel 12 so that the arms 52 engage the fence panel 12 when clamps 50 are tightened.

The fence panels 12 are generally rectangular. The fence panels 12 are constructed of multiple vertical ribs 40 and multiple horizontal ties 42 welded at their intersections. The horizontal ties 42 are disposed on the inside of the security system 2 (i.e. the inward face of the fence panels 12) so that they cannot be used as surfaces for climbing. A bottom plate 44 defines the lower edge of fence panel 12. At the top of each panel, ribs 40 extend up past the uppermost horizontal tie 42 to define pickets that make climbing over the fence panel 12 difficult. Each fence panel 12 can extend above the top of each fence post 10 to make climbing over fence panel 12 difficult. For example, each fence post 10 can be seven feet tall with each fence panel 12 extending about one foot above the top of each fence post 10 to reach about 8 feet of height above the conductive mat 6.

Figure 3:
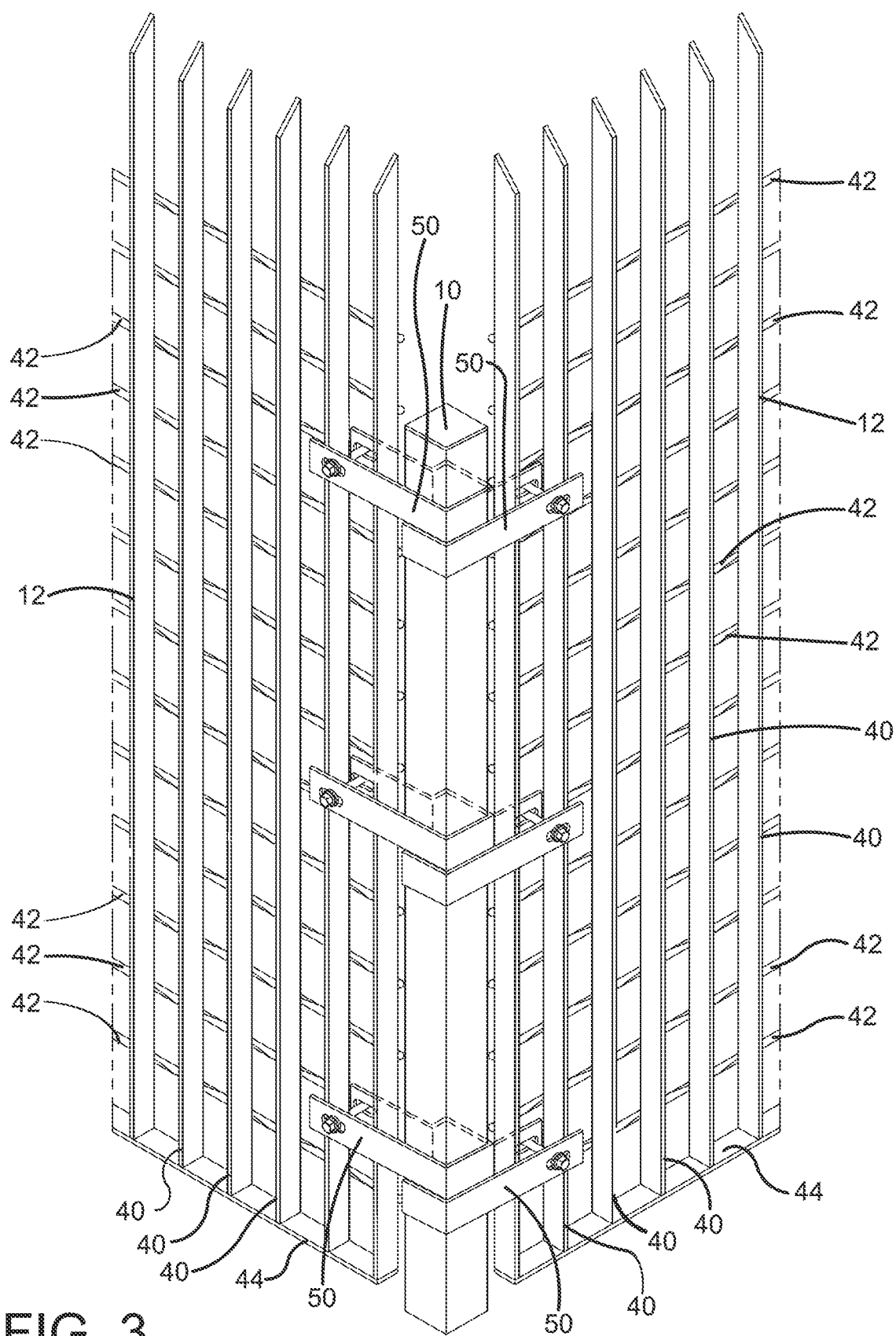
FIG. 3 illustrates a perspective view of a corner post-showing fence sections connected to the corner post.

The ribs 40 can include a device coupled near or at the top of the ribs 40 to make climbing over the fence panel 12 difficult. For example, barbed wire can be attached to the top of the ribs 40. The barbed wire can be attached horizontally spanning multiple ribs 40. For example, as shown in FIGS. 3-4, the device can be an angled end generally similar to a barb of the barbed wire.

Figure 4:
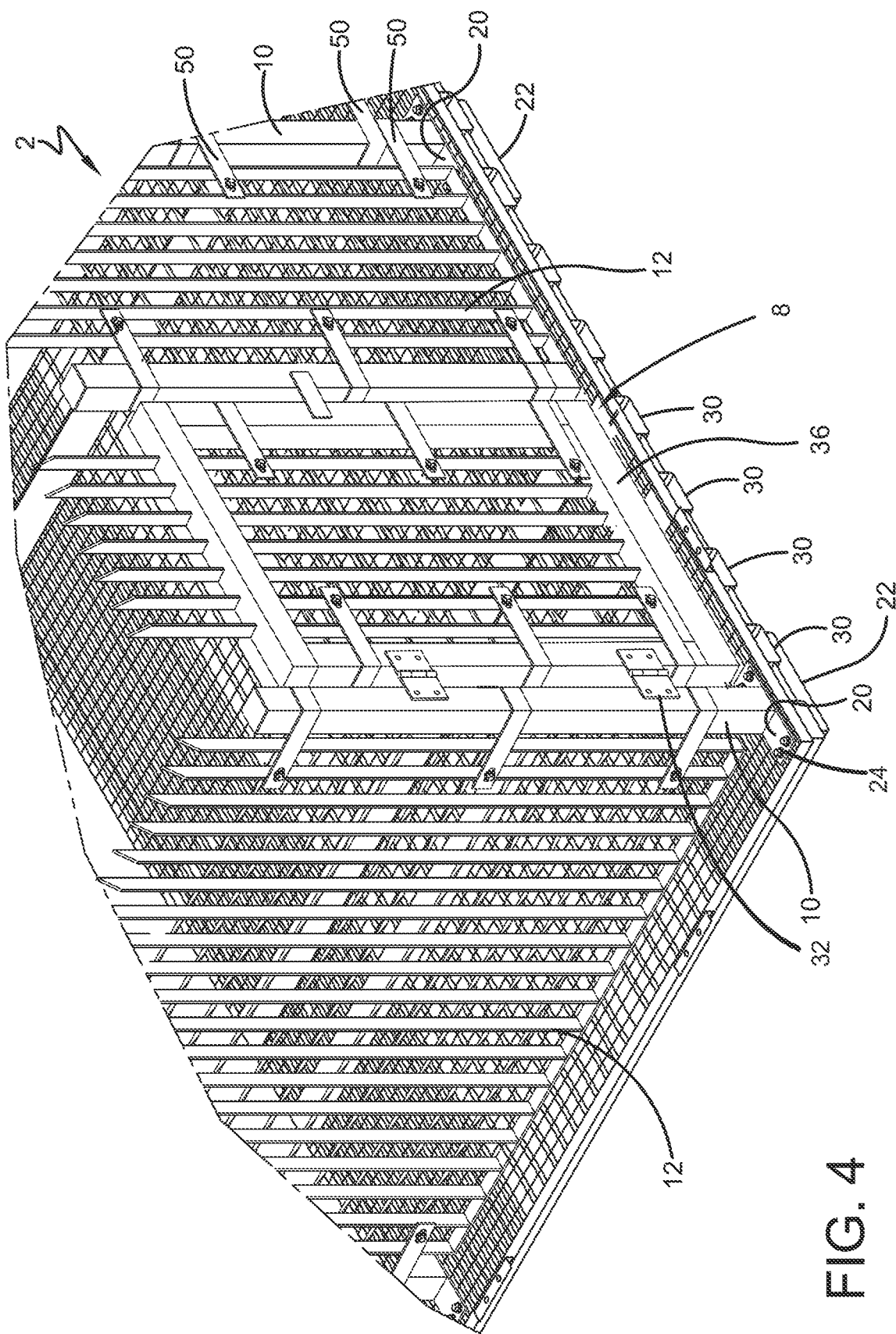
FIG. 4 illustrates a perspective view of the exemplary configuration of the security fence.

As shown in FIG. 4, the conductive fence 4 can have a lockable door 8. The lockable door 8 is supported on hinges 32 coupled to a fence post 10 so that the lockable door 8 can be moved between an open and a closed condition. The lockable door 8 is generally rectangular. The lockable door 8 is constructed of multiple vertical ribs 40 and multiple horizontal ties 42 welded at their intersections and arranged to make climbing through the lockable door 8 difficult. The horizontal ties 42 are disposed on the inside of the security system 2 (i.e. the inward face of the lockable door 8) so that they cannot be used as surfaces for climbing. The horizontal ties 42 and the vertical ribs 40 are coupled to a door frame 36. The door frame 36 is rotatably coupled to the fence post 10. At the top of the lockable door 8, vertical ribs 40 extend up past the door frame 36 to define pickets that make climbing over the door frame 36 difficult.

A lock latch 34 is provided to allow the lockable door 8 to be locked closed or locked open. When the lockable door 8 is used by workers, the lockable door 8 can be removed to provide an opening in security system 2 for easier access if desired. The hinges 32 can be bolted to the fence post 10. In configurations where the lockable door 8 can be removed, hinges 32 are configured allow the lockable door 8 to be lifted up and off of the hinges 32.

An entrance and exit platform can be attached to the conductive mat 6 outside the perimeter of the conductive fence 4 at the lockable door 8 to facilitate worker ingress and egress. The entrance and exit platform can have a section that is non-conductive. The entrance and exit platform can include a grounding access mat. A grounding access mat ensures workers entering the equipotential security perimeter are adequately grounded prior to accessing the interior of the security system 2. The security system 2 can include an enclosure surrounding the equipotential zone of the security system 2. The enclosure can be non-conductive and configured to prevent human contact with the fence while being in contact with the ground. For example, a plastic fence or concrete barrier can be placed around the equipotential security system 2.

The security system 2 is configured to be easily transportable and readily assembled and disassembled in the field at remote locations with hand or battery-operated tools. The security system 2 can be configured to enclose an electrical sub-station. The electrical sub-station can be portable. FIG. 6 shows a portable electric substation 60 placed on multiple conductive mats 6 and within the conductive fence 4. A non-conductive surface 62 is provided about the entire perimeter of conductive fence 4 to ensure that a person touching fence 2 is standing on a non-conductive surface 62. The non-conductive surface 62 can be made up of multiple non-conductive mats, which extend 8 to 10 feet from conductive fence 4. For example, non-conductive mats can be timber mats or polymer mats. A non-conductive enclosure 64 can surround the non-conductive surface 62. For example, the enclosure 64 can be a plastic fence or concrete barrier.

A number of implementations have been described. Nevertheless, it will be understood that various modifications can be made without departing from the spirit and scope of the invention.

What is claimed is:

1. A security system comprising:
   a conductive fence;
   a conductive mat mechanically and electrically coupled to the conductive fence, wherein the conductive fence and the conductive mat define an equipotential zone;
   an enclosure surrounding the equipotential zone, the enclosure configured to prevent a human from contacting the conductive fence while the human is in contact with a ground surface;
   a lockable door coupled to the conductive fence; and
   a grounding access mat, wherein the grounding access mat is coupled to the conductive mat and to the enclosure at the lockable door.

2. The system of claim 1, wherein the enclosure is non-conductive.

3. The system of claim 1, wherein the conductive mat has a conductive layer and a non-conductive layer.

4. The system of claim 1, wherein the conductive mat is a metal equipotential grounding grate.

5. The system of claim 1, wherein the conductive fence further comprises:
   a plurality of fence posts electrically and mechanically coupled to the conductive mat; and
   a plurality of fence panels electrically and mechanically coupled to plurality of the fence posts.

6. The system of claim 5, wherein a plurality of clamps electrically and mechanically coupled the fence panels to the fence posts.

7. The system of claim 5, wherein a height of the plurality of fence posts is configured to prevent a person from climbing over the conductive fence.

8. The system of claim 5, wherein the plurality of fence panels further comprise:
   a plurality of vertical ribs; and
   a plurality of horizontal ties, wherein the vertical ribs are mechanically and electrically coupled to the horizontal ties to prevent a person from climbing through the plurality of fence panels.

9. The system of claim 8, wherein the plurality of vertical ribs are configured to prevent a person from climbing over the vertical ribs.

10. The system of claim 9, wherein a height of the plurality of vertical ribs is configured to prevent a person from climbing over the conductive fence.

11. The system of claim 8, the plurality of vertical ribs having a first end and a second end, wherein the first end and the second end are shaped to prevent a person from climbing over the conductive fence.

12. The system of claim 1, wherein the lockable door further comprises:
 a door frame;
 a plurality of horizontal ties mechanically and electrically coupled to the door frame;
 a plurality of vertical ribs, wherein the plurality of vertical ribs and the plurality of horizontal ties are mechanically and electrically coupled to the door frame to prevent a person from climbing through the lockable door;
 hinges mechanically and electrically coupled to a door frame first side and a door hinge fence post; and
 a lock latch mechanically coupled to a door frame second side and a door lock fence post.

13. The system of claim 1, wherein the security system is configured to enclose an electrical sub-station.

14. The system of claim 13, wherein the electrical sub-station is portable.

15. The security system of claim 1, wherein the grounding access mat is positioned at an entrance to the conductive fence.

16. An equipotential grounding system comprising:
 a portable electrical substation disposed on a plurality of grounding grates and within a security fence, wherein the grounding grates are mechanically and electrically coupled to the security fence, wherein the security fence further comprises a lockable door; and
 a grounding access mat positioned at an entrance to the security fence, the entrance comprising the lockable door, the entrance configured to prevent ungrounded personnel and equipment from entering the portable electric substation without touching the grounding access mat, wherein the grounding access mat is mechanically and electrically coupled to the plurality of grounding grates and to the security fence at the lockable door.

17. The system of claim 16, wherein the security fence further comprises:
 a plurality of fence posts mechanically and electrically coupled to the grounding grates; and
 a plurality of fence panels electrically and mechanically coupled to the plurality of fence posts.

* * * * *